Dec. 18, 1923.　　　　　1,477,605
E. STEIGERWALD ET AL
SPRING CLIP
Filed Aug. 10, 1922　　2 Sheets-Sheet 1
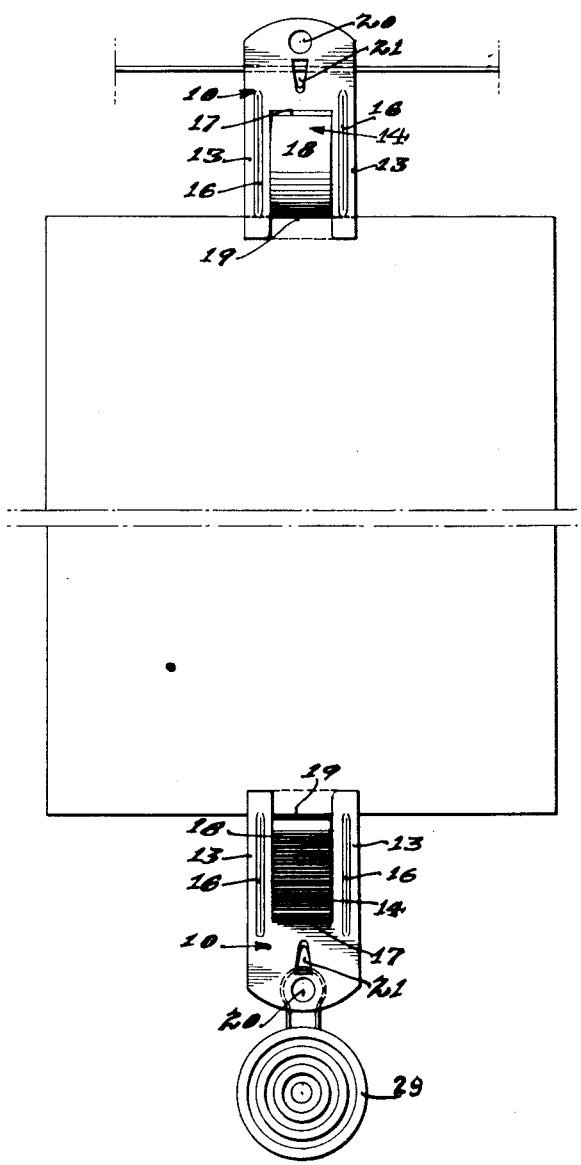
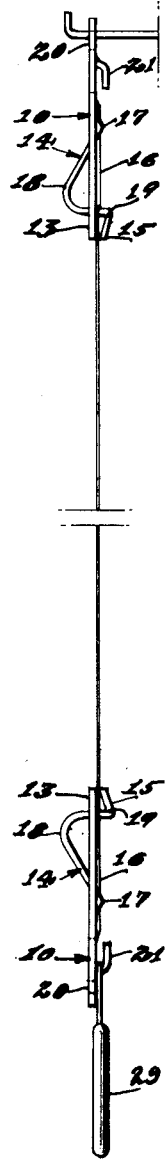
WITNESSES:-
INVENTORS
Edward Steigerwald
Frank L.H. Pfeil
BY Joshua R.H. Potts,
THEIR ATTORNEY Dec. 18, 1923.
E. STEIGERWALD ET AL
1,477,605
SPRING CLIP
Filed Aug. 10, 1922   2 Sheets-Sheet 2
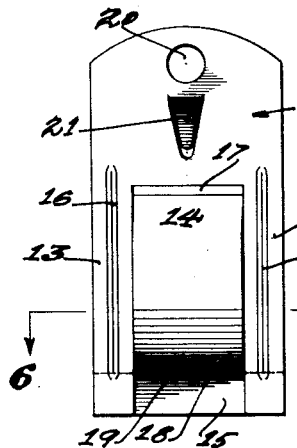
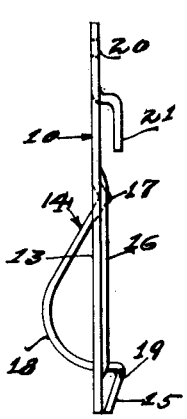
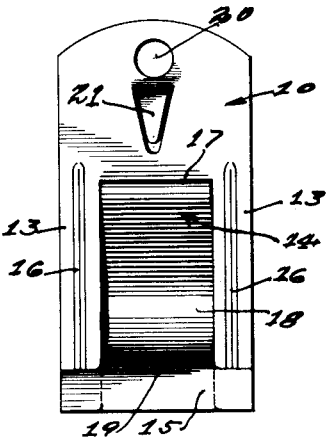
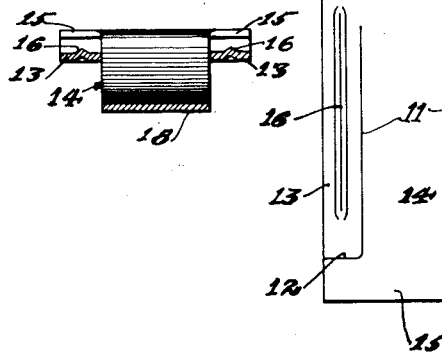
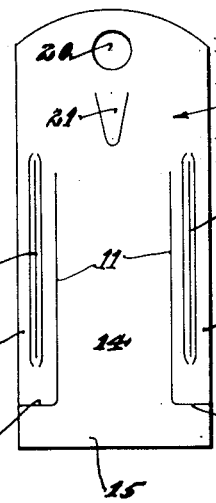
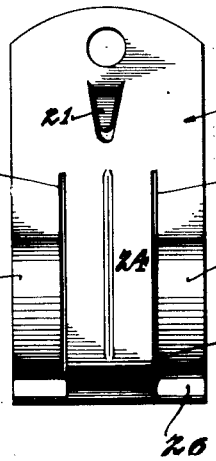
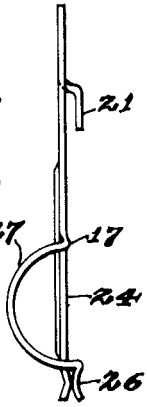
WITNESSES:-
INVENTORS
Edward Steigerwald
Frank L. H. Pfeil
BY Joshua R. H. Potts
THEIR ATTORNEY Patented Dec. 18, 1923.

1,477,605

UNITED STATES PATENT OFFICE.

EDWARD STEIGERWALD AND FRANK L. H. PFEIL, OF PHILADELPHIA, PENNSYLVANIA.

SPRING CLIP.

Application filed August 10, 1922. Serial No. 580,829.

*To all whom it may concern:*

Be it known that we, EDWARD STEIGERWALD and FRANK L. H. PFEIL, citizens of the United States, residing at Philadelphia, county of Philadelphia, and State of Pennsylvania, have invented certain new and useful Improvements in Spring Clips, of which the following is a specification.

Our invention relates to spring clips, and the object of the invention is to provide such a clip which may be made from a single piece of sheet metal and which, while especially adapted for use in draining photographic films, may be used for suspending tags, cards or like objects.

These objects, and other advantageous ends which will be described hereinafter, we attain in the following manner, reference being had to the accompanying drawings in which Figure 1 is a face view showing the improved spring clip in use, with one supporting means, Figure 2 is an edge view of Figure 1, with another supporting means, Figure 3 is a face view of a clip, Figure 4 is an edge view, Figure 5 is a rear elevation, Figure 6 is a horizontal sectional view taken on the line 6—6 of Figure 3, Figure 7 is a plan view of a blank from which a clip is formed, Figure 8 is a face view of another form of clip, and Figure 9 is an edge view of the clip shown in Figure 8.

The improved clip consists of a single plate 10 stamped from a sheet of spring metal, preferably non-corrosive, and shown as of rectangular form except that the upper edge is curved. The plate, as shown in Figures 1 to 7 of the drawings, is stamped to provide two angular slits having long arms 11 parallel with the sides of the plate and short arms 12 extending to the sides of the plate. This forms two comparatively narrow side members 13 and a comparatively wide T-shaped central tongue 14 with the cross part 15 of the T below the free ends of the side members. The side members 13 are preferably pressed to form longitudinal reinforcing corrugations 16 and tongue 14 is pressed to form a transverse rearwardly extending corrugation 17 and a forwardly extending curved spring 18 with the cross part of the T extending in the rear of the side members and bent downwardly and inwardly to bring its lower front edge in contact with the lower rear edges thereof as shown in Figures 2 and 4 of the drawings.

Owing to the longitudinal corrugations, the side members are rigid as compared to the spring member and the contacting parts of the spring member and the side members form resilient gripping jaws adapted to hold films, tags and the like. A part 19 of the central tongue extending to the rear of the side members serves as a stop to limit the extent to which a film or tag may enter the gripping jaws.

The upper part of the plate is stamped to provide an aperture 20 to permit hanging the clip from a hook or nail and to provide a burr which is pressed rearwardly to form a hook 21 by which the clip may be hung on a stretched wire or cord or by which a weight may be attached when the clip is used in reversed position.

In use, the gripping jaws are forced apart, the film or other object inserted and the jaws allowed to close. The construction affords wide gripping parts which do not pierce or otherwise injure the strip which is engaged.

Inasmuch as the margin on photographic films is usually but three-sixteenths of an inch in width and any gripping action within that margin will injure the film, the stop which limits the extent to which a strip may enter the jaws, is especially desirable when the clip is to be used for draining films.

For draining and drying films or prints which are liable to curl or warp as they dry, the clips should be used in pairs, one clip being attached at the upper end to suspend the film and another being attached at the lower end with a weight 29 carried by hook 21 as shown in Figure 1.

In the modification shown in Figures 8 and 9 of the drawings, the form of the gripping members is practically reversed. Longitudinal slits 22 are connected at their lower ends by a transverse slit 23 thus forming a short central tongue 24 leaving the side members 25 connected by a transverse part 26. The side members are bent forwardly to form a curved spring 27, corresponding to spring 18 in the other form and the transverse strip 26 is brought to the rear of tongue 24 to form the gripping jaws. The edges of these jaws are flared outwardly to permit ready entrance of a tag or other object.

This construction is more especially adapted for use with tags or other objects which are sufficiently rigid to open the gripping jaws by pressure exerted upon the tag.

While we have described our invention as taking a particular form, it will be understood that the various parts of our invention may be changed without departing from the spirit thereof, and hence we do not limit ourselves to the precise construction set forth, but consider that we are at liberty to make such changes and alterations as fairly come within the scope of the appended claims.

Having thus described our invention, what we claim as new and desire to secure by Letters Patent is:—

1. A spring clip consisting of a single plate of spring metal stamped to provide a central tongue member and a side member cut from and extending along the side of said tongue member, one of said members having a longitudinal re-enforcing ridge making it comparatively rigid and the other member being curved and forming a spring member, and a transverse member at the end of said spring member, bent to contact with said rigid member thereby forming resilient gripping jaws.

2. A spring clip consisting of a plate of spring metal stamped to provide side members re-enforced by longitudinal corrugations, a central tongue extending between said side members, and a transverse member carried by the tongue, the tongue being bent to provide a spring member and the transverse member being bent to contact with the free ends of the side members, thereby forming resilient gripping jaws.

3. A spring clip consisting of a plate of spring metal stamped to provide side members, a central tongue cut from between said side members, and a transverse member formed integrally with the lower end of said tongue, the side members having longitudinal corrugations, the tongue being bent to provide a spring member and the transverse member being bent to provide clamping contact with the free ends of the side members thereby forming resilient gripping jaws.

4. A spring clip consisting of a single plate of spring metal stamped to provide side members and a central tongue cut from between said side members, a transverse corrugation at the upper part of said tongue, and a transverse member at the lower end of said tongue, the tongue being bent to form a curved spring member, and the transverse member being bent to contact with the ends of the side members thereby forming resilient gripping jaws.

5. A spring clip consisting of a plate of spring metal stamped to provide side members and a central tongue cut from between said side members, a transverse member formed integral with said tongue, the side members having longitudinal re-enforcing corrugations, the tongue being bent to provide a spring member and the transverse member being bent to provide clamping contact with the free ends of the side members thereby forming resilient gripping jaws, and a hook and an opening provided on the upper end of said clip for suspending said member.

In testimony whereof we have signed our names to this specification in the presence of two subscribing witnesses.

EDWARD STEIGERWALD.
FRANK L. H. PFEIL.

Witnesses:
CHAS. E. POTTS,
ELIZABETH GARBE.